Figure 1:
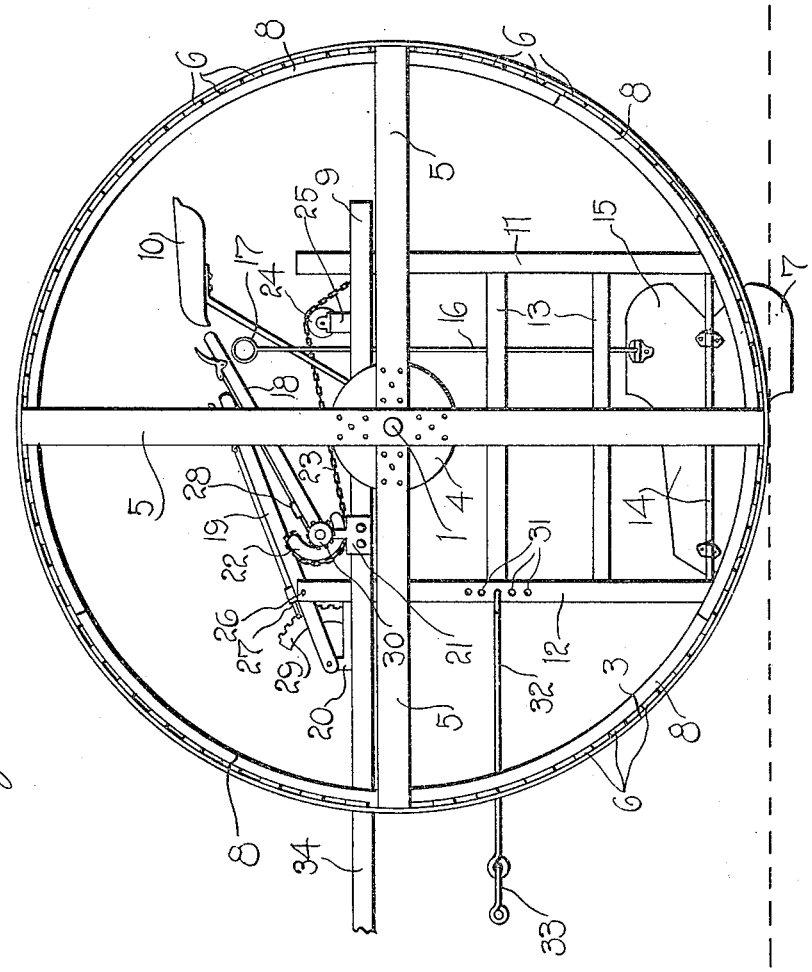

G. E. PATTON.
POTATO DIGGER.
APPLICATION FILED APR. 1, 1914.

1,125,390.

Patented Jan. 19, 1915.
2 SHEETS—SHEET 1.

Inventor
GEORGE E. PATTON
By Watson E. Coleman
Attorney

Witnesses
Robert M. Sutphen
A. L. Hind

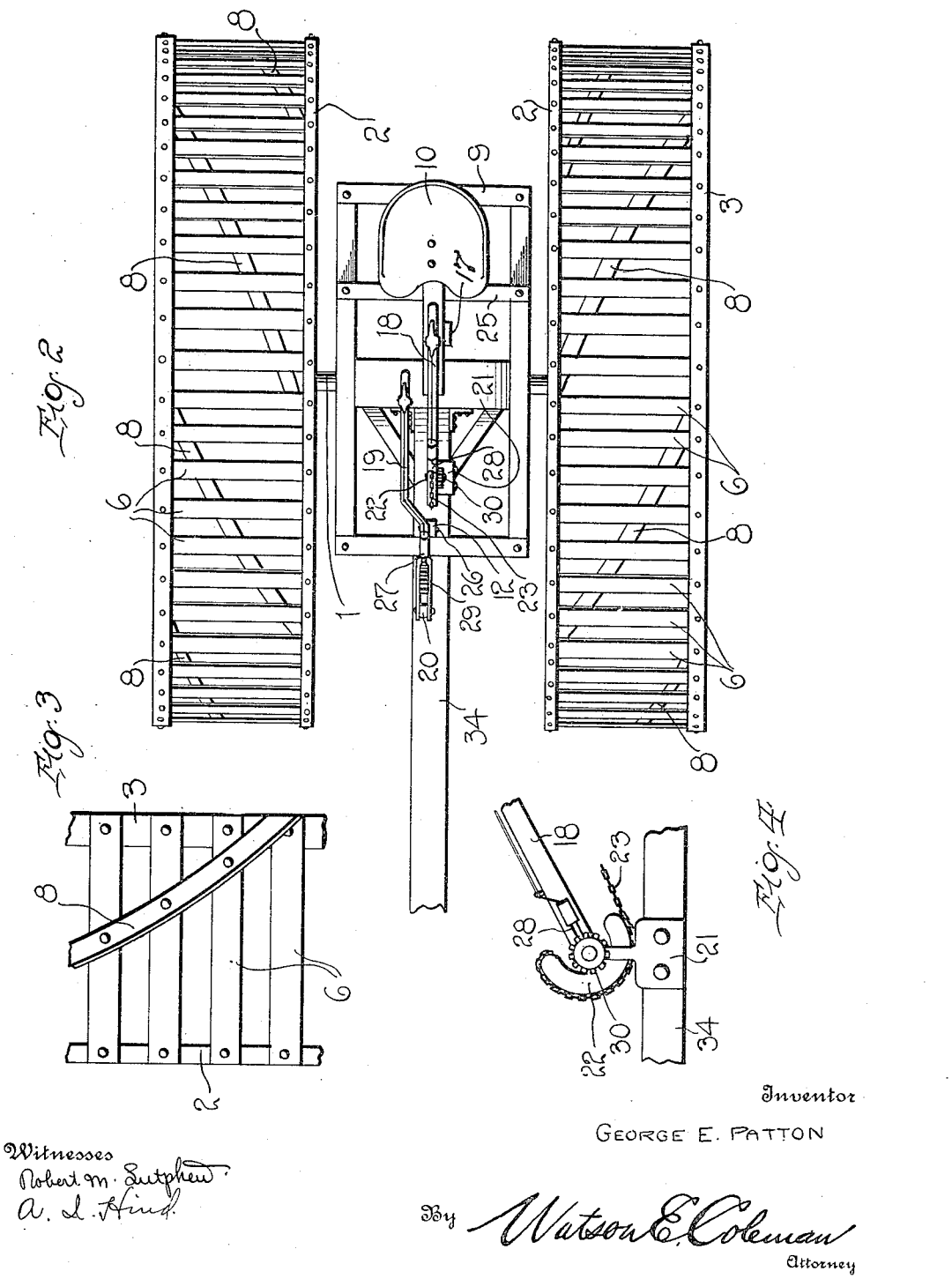

UNITED STATES PATENT OFFICE.

GEORGE E. PATTON, OF ALMOND, NEW YORK, ASSIGNOR OF ONE-HALF TO ARTHUR C. HARMAN, OF HORNELL, NEW YORK.

POTATO-DIGGER.

1,125,390.      Specification of Letters Patent.      Patented Jan. 19, 1915.

Application filed April 1, 1914. Serial No. 828,897.

*To all whom it may concern:*

Be it known that I, GEORGE E. PATTON, a citizen of the United States, residing at Almond, in the county of Allegany and State of New York, have invented certain new and useful Improvements in Potato-Diggers, of which the following is a specification, reference being had to the accompanying drawings.

This invention relates to potato diggers.

The object of the invention is to provide an apparatus of this character, that shall be simple in construction, highly efficient and durable in use, and which will, in operation, with the minimum output of labor, secure the maximum results, and without danger of injury to the potatoes unearthed.

With the above and other objects in view, as will appear as the nature of the invention is better understood, the same consists in the novel construction and arrangement of parts of a potato digger, as will be hereinafter fully described and claimed.

In the accompanying drawings forming a part of this specification, and in which like characters of reference indicate corresponding parts: Figure 1 is a side elevation of a potato digger constructed in accordance with the present invention; Fig. 2 is a top plan view thereof; Fig. 3 is a fragmentary detail view in elevation of a part of one of the walls; Fig. 4 is a similar view in elevation of one of the elevating levers for the plow share.

The apparatus comprises an axle 1, upon which are supported two wheels which form one of the essential features of the present invention. Each wheel consists of two rims 2 and 3, the rims 2 being connected with the hubs 4 by any desired number of spokes 5. The inner rims 2 are comparatively light, while the outer rims are comparatively heavy and are designed to support the weight of the machine. Connecting the two rims are spaced slats 6, which are designed to permit the escape of the soil thrown thereon by the plow share 7, and secured to the inner sides of the rims 2 and 3 are diagonal flights 8, of which any number may be employed, and the function of which is to hold the soil discharged upon the slats from rolling, and to prevent the plow from throwing soil too far into the wheels, the flights serving also to direct the potatoes laterally from the wheels.

Disposed upon the axle is a frame 9, which is herein shown as of rectangular form, and upon which is supported a seat 10. Arranged between and projecting above the side bars of the frame are two standards 11 and 12 that are connected intermediate their ends by cross braces 13, and journaled in the lower ends of the standards is a shaft 14 carrying a double mold-board plow share 15 on the order of an ordinary hill plow. This plow share is intended to be reversible, so as to enable it to throw the removed soil and potatoes onto the inner surfaces of the wheels alternately according to its inclination, the reversing of the share being effected by a rod 16, one end of which is secured to the rear portion of the plow share and the upper end of which is provided with a handle 17 disposed adjacent to the seat, and thus in position to be grasped by the driver of the apparatus.

As will be obvious, it is essential that means be provided whereby the depth of the cut of the plow may be varied to meet conditions that may arise in digging potatoes, as some are buried deeper than others, and to accomplish this result levers 18 and 19 are provided which are pivoted upon standards 21 and 20 supported by the frame 9. The lever 18 is provided with a segmental head 22 around which passes one end of a chain 23, the other end of which passes over a sheave 24 suitably supported upon a cross piece 25 on the frame, the free end of the chain being secured in any suitable manner to the standard 11. The pivotal point on the lever 19 is at its outer end, the intermediate portion of the lever being connected at 26 to the upper end of the standard 12. Each of the levers has a spring controlled latch 28 and 27, respectively, that are designed to engage rack bars 30 and 29, so that when the levers are actuated to raise or lower the standards and thus the plow share, they may be readily held in their adjusted positions.

The standard 12 is provided with a series of openings 31 any one of which is engaged by the inner end of a rod 32, the outer end of which carries a clevis 33 of the usual or any preferred construction and to which the swingletrees are connected. The implement is also provided with a draft pole 34 such as is commonly employed in structures of this character.

In the operation of this implement, as the same is drawn along the rows of planted potatoes, the plow will turn over the soil and with it the potatoes and discharge the same within one of the wheels and upon the slats thereof, and as the wheels revolve, the soil will be caused to discharge between the slats, while the spiral flights will work the freed potatoes laterally from the wheel onto the ground.

From the foregoing description it will be seen that although the improvements herein described are simple in character they will be thoroughly efficient for the purpose designed and will coact in the production of a highly effective form of potato digger.

Having thus described my invention, what I claim is:

1. A potato digger comprising an axle, slatted wheels carried thereby, diagonally disposed flights arranged on the inner sides of the wheels, a frame supported by the axle, and a reversible plow share carried by the frame.

2. A potato digger comprising an axle, slatted wheels carried thereby, diagonally disposed flights arranged on the inner sides of the wheels, a frame supported by the axle, a reversible plow share carried by the frame, and means for raising and lowering the share.

3. A potato digger comprising an axle, slatted wheels carried thereby, diagonally disposed flights arranged on the inner sides of the wheels, a frame supported by the axle, a plow share, standards having their lower ends supporting a shaft upon which the plow share is mounted, the upper ends of the standards projecting above the frame, means for raising and lowering the standards, and means for reversing the plow share.

In testimony whereof I hereunto affix my signature in the presence of two witnesses.

GEORGE E. PATTON.

Witnesses:
 LEWIS L. PALMER,
 JAMES W. McMICHAEL.

Copies of this patent may be obtained for five cents each, by addressing the "Commissioner of Patents, Washington, D. C."